(No Model.)

W. S. REED.
BICYCLE.

No. 426,855. Patented Apr. 29, 1890.

Witnesses:
E. P. Ellis,
B. Brookett.

Inventor:
W. S. Reed,
per F. A. Lehmann,
Atty.

UNITED STATES PATENT OFFICE.

WILLARD S. REED, OF LEIPSIC, DELAWARE.

BICYCLE.

SPECIFICATION forming part of Letters Patent No. 426,855, dated April 29, 1890.

Application filed March 3, 1890. Serial No. 342,365. (No model.)

*To all whom it may concern:*

Be it known that I, WILLARD S. REED, of Leipsic, in the county of Kent and State of Delaware, have invented certain new and useful Improvements in Bicycles; and I do hereby declare the following to be a full, clear, and exact description of the invention, such as will enable others skilled in the art to which it pertains to make and use it, reference being had to the accompanying drawings, which form part of this specification.

My invention relates to an improvement in bicycles; and it consists in the combination of the body, the rear driving-wheel provided with sprocket-wheels upon its hub, the driving-chains, the treadle-wheels journaled in a vertically-adjustable frame, and the cogged portions of the main frame, upon which the sliding frame is made adjustable, as will be more fully described hereinafter.

The object of my invention is to provide a bicycle in which the driving-wheels are made vertically adjustable, so as to adapt the bicycle to be used by persons of different sizes, and to provide the frame with a pivoted guard which protects the person's clothes from dust or other dirt.

Figure 1:
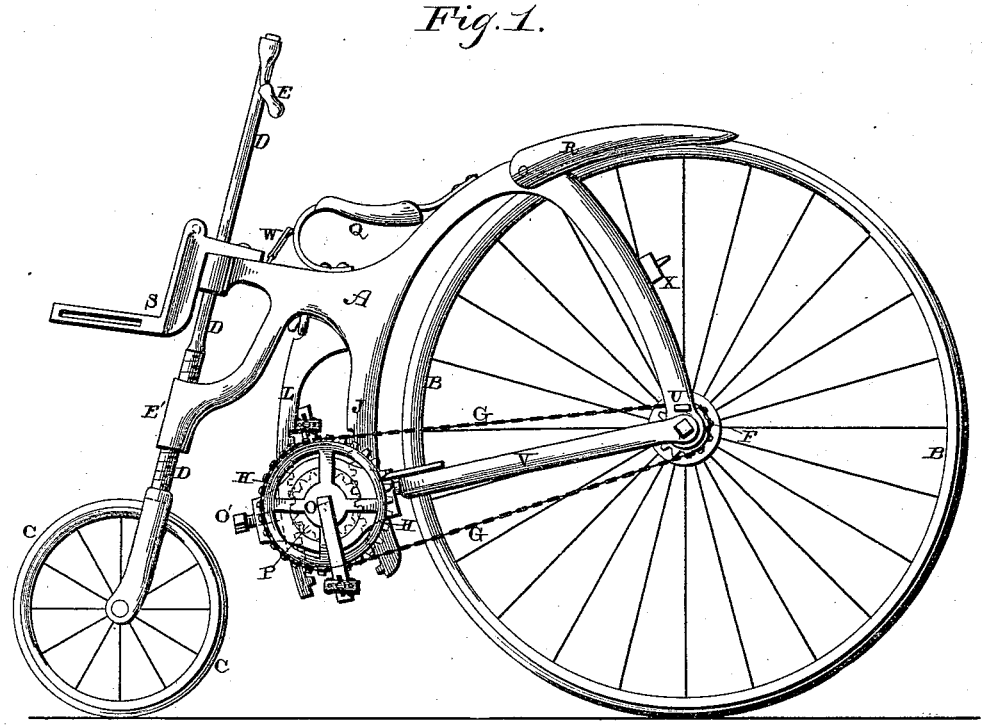
Figure 2:
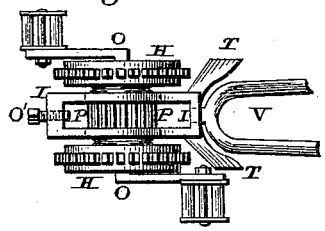

Figure 1 is a side elevation of a bicycle which embodies my invention complete. Fig. 2 is an inverted view of the vertically-adjustable frame in which the driving-cranks are placed.

A represents the main body or frame, which is preferably made of the shape here shown, and in which the large driving-wheel B is journaled. The large wheel B and the small wheel C are of the same construction and will be given any desired size, the small wheel being placed in front and journaled in the lower end of the screw-threaded rod D, to the upper end of which the handle E is secured in the usual manner. The lower end of the rod D is made screw-threaded where it passes through the part E' of the frame A, so that the wheel C can be adjusted in such a manner that the seat may be made either high or low to suit the length of any one's arms. By this construction the machine can be changed according to the height of the rider, and thus adapt it to be used by different persons. This construction is a great advantage, especially to those who have machines for hire, and thus prevents them from having to buy so many different sizes.

Upon each end of the hub of the driving-wheel B is formed a sprocket-wheel F, and around these sprocket-wheels pass the two driving-chains G. Sprocket-wheels F are only about a quarter the size of the crank-wheels H, secured to the crank-shaft O, journaled in a frame I, which is made vertically adjustable upon the two cogged portions J L of the frame A. The frame I passes over the lower ends of the two cogged portions J L of the frame, and is secured in any desired place thereon by means of the set-screw O'. In the frame I are made cogs P, which engage with the teeth upon the two parts J L of the frame, and is held in any desired position thereby. In order to assist in supporting this frame I in position, and at the same time greatly strengthen the different parts, the forked brace V is used, and which has its front end screwed or otherwise secured to the frame, while its rear ends are supported by the axle of the large wheel B. As this brace is pivoted at its rear end upon the axle, its front end rises and falls as the frame I is adjusted upon the parts J L. The outer portion L is made separate from the frame and merely hooks at its upper end upon the frame A, so as to have a slight pivoted movement, and thus adapt it to be moved slightly outward at its lower end when the set-screw O is relaxed, and thus allow the frame I to be adjusted either up or down. By adjusting the treadles up and down the bycicle is adapted to be used by persons of different sizes. In adjusting the frame I and wheels H vertically they move through a segment of a circle, the center of which is at the center of the wheel B, and thus the chains G are never loosened or tightened when the wheels are moved. The wheels H are made about four times the size of the wheels F, so as to give the large wheel a very rapid movement.

Pivoted to the frame A, just to the rear of the seat Q, which is provided with an adjustable strap W, is a pivoted guard R, which extends backward over the top edge of the wheel any suitable distance, and thus protects the rider's clothes from dust and dirt.

Placed upon the front end of the frame A, and through which the guiding-rod D passes, is a chair S, for the purpose of carrying a valise, package, or child, as may be desired. Formed or secured upon the rear edge of the frame A is a small box, in which an oil-can is placed.

Secured to the frame I, and extending backward just beyond the front edge of the wheel B, are the stirrups T, from which the rider mounts upon the seat Q. From the rear end of the frame A, just above the hub, are also formed stirrups U, from which the rider mounts into his seat from behind. The rider can use either of the stirrups, according to the manner in which he desires to mount from the front or rear.

By means of the adjustment of the rod D in front and the treadle-wheels H the same bicyle may be adapted to be used by persons of different sizes, and thus the same wheel be used comfortably by a number of different people.

Having thus described my invention, I claim—

1. The combination of the frame A, provided with the toothed part J, the movable toothed part L, the frame I, the treadle-shaft journaled in the frame I, the wheels H, the chains G, the sprocket-wheels F, and the large wheel B, the frame I being made vertically adjustable upon the two parts J L of the frame, substantially as described.

2. The combination of the frame A, having the toothed portion J, the separated toothed part L, hooked upon the frame A, so as to be made adjustable thereon, the frame I, provided with cogs P, the set-screw O, the treadle-shaft journaled in the frame I, the wheels H, the chains G, the sprocket-wheels F, and the large wheels B, substantially as set forth.

3. The combination of the frame I, provided with cogs, the frame A, provided with two cogged parts J L, and the brace V, pivoted at its rear end upon the rear axle and connected with the frame I at its front end, substantially as specified.

In testimony whereof I affix my signature in presence of two witnesses.

WILLARD S. REED.

Witnesses:
DAVID C. CUMMINS,
W. W. CAHALL.